(12) United States Patent
Leist et al.

(10) Patent No.: US 7,350,378 B2
(45) Date of Patent: Apr. 1, 2008

(54) METHOD FOR PRODUCING ROTATIONALLY SYMMETRICAL QUARTZ GLASS CRUCIBLES

(75) Inventors: Johann Leist, Altenstadt (DE); Rolf Göbel, Gelnhausen (DE); Helmut Fritz, Bierstein (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 812 days.

(21) Appl. No.: 10/070,847

(22) PCT Filed: Jul. 9, 2001

(86) PCT No.: PCT/EP01/07858

§ 371 (c)(1),
(2), (4) Date: Mar. 11, 2002

(87) PCT Pub. No.: WO02/04368

PCT Pub. Date: Jan. 17, 2002

(65) Prior Publication Data

US 2002/0170316 A1 Nov. 21, 2002

(30) Foreign Application Priority Data

Jul. 11, 2000 (DE) .............................. 100 33 632

(51) Int. Cl.
*C03B 19/09* (2006.01)
(52) U.S. Cl. ......................... 65/17.3; 65/425
(58) Field of Classification Search ................ 65/17.3, 65/17.5, 425, 427, 474, 417, 419, 420, 378, 65/173, 33, 33.1, DIG. 30.1
See application file for complete search history.

(56) References Cited

U.S. PATENT DOCUMENTS

| 5,989,021 A * | 11/1999 | Sato et al. .................. 432/264 |
| 6,143,073 A * | 11/2000 | Christman et al. .......... 117/208 |
| 6,381,987 B1 * | 5/2002 | Werdecker et al. .......... 65/17.5 |
| 6,853,673 B2 * | 2/2005 | Fukui et al. .................. 373/62 |
| 2004/0118156 A1 * | 6/2004 | Korus et al. .................. 65/17.3 |

FOREIGN PATENT DOCUMENTS

| EP | 0 911 429 A | 4/1999 |
| FR | 2 746 092 A | 9/1997 |

OTHER PUBLICATIONS

"Electric Arc." Encyclopedia Britannica Online, retireved Aug. 11, 2004 http//www.search.eb.com/eb/article?eu=32829.*

* cited by examiner

Primary Examiner—Carlos Lopez
(74) Attorney, Agent, or Firm—Tiajoloff and Kelly

(57) ABSTRACT

In a device (5) for the manufacture of a quartz glass crucible (2), one section (14, 15) of a wall (13) of the rotating quartz glass crucible (2) is heated at one time by means of at least two electrode arrangements (7, 8) distributed uniformly at the circumference of the quartz glass crucible (2) and generating a first and another electric arc. By providing several electrode arrangements (7, 8), the cooling-down phase of the sections (14, 15) until their reaching the subsequent heating zone (11, 12) can be shortened, and thus an undesirable high temperature difference of the wall (13) can be avoided. Moreover, the required thermal output of each individual electrode arrangement (7, 8) can be reduced, so that evaporation phenomena and connected bubble formation can be reduced. In addition to the higher quality that can be reached in this way, the duration of the manufacturing process is reduced.

21 Claims, 1 Drawing Sheet

METHOD FOR PRODUCING ROTATIONALLY SYMMETRICAL QUARTZ GLASS CRUCIBLES

Figure 1:
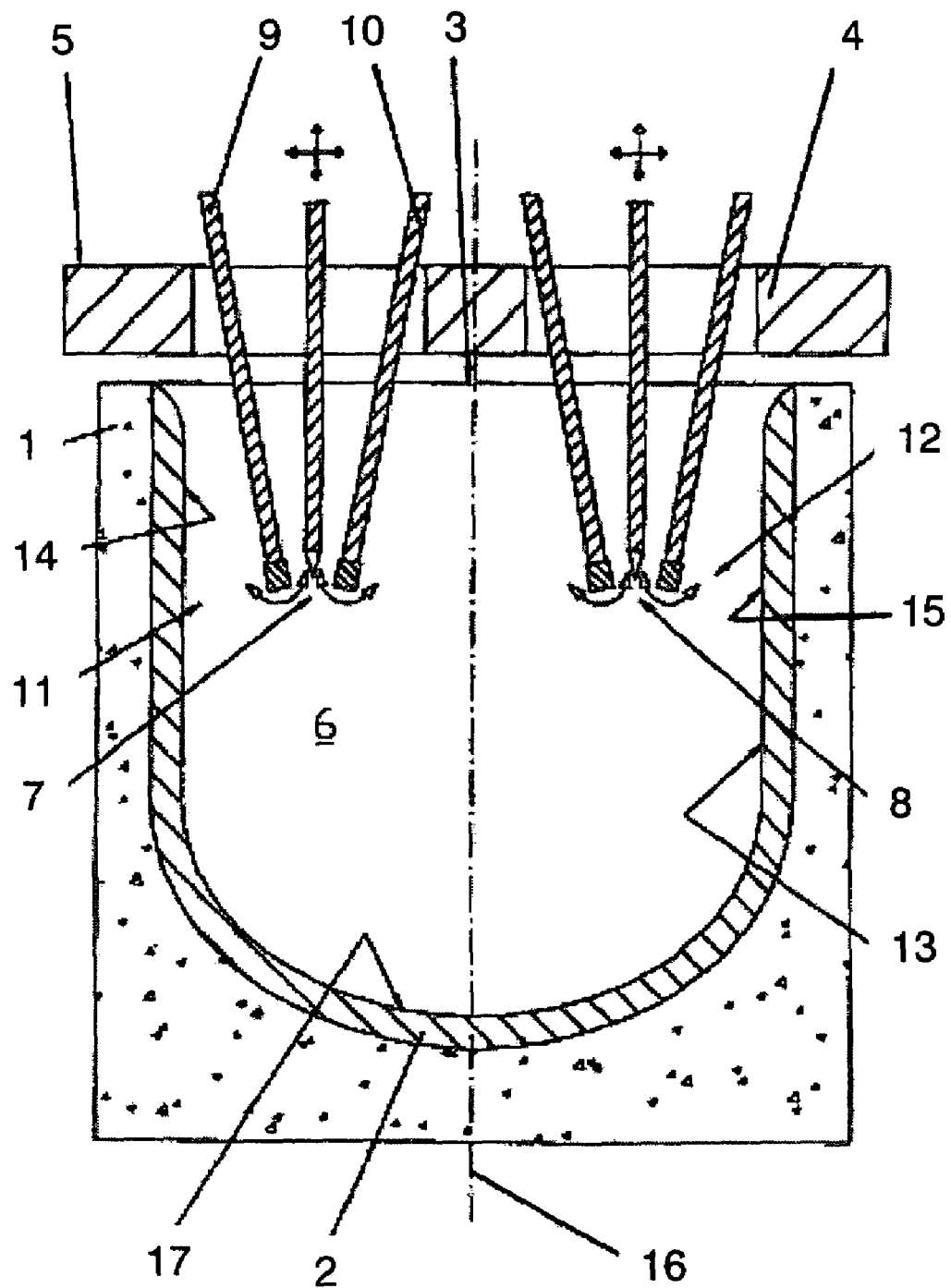

The invention concerns a process for producing rotationally symmetrical quartz glass crucibles where an electric arc is produced by means of an arrangement of electrodes comprising one or more anodes and a cathode, thereby heating a wall or a portion of a wall of a rotating quartz glass crucible. Furthermore, the invention concerns a device for implementing the process.

A process and a device of the above kind are frequently used in the trade because they are very economical. A melt form is rotated and partially filled with $SiO_2$ granulate which may be natural or synthetic. A preform of the final quartz glass crucible is made from the granulate during the rotation by means of a template. Thereafter an electric arc is ignited by means of an electrode arrangement and is guided at various levels along the rotating wall of the quartz glass crucible whereby the quartz glass granulate is melted into a glassy wall in the shape of the quartz glass crucible. Once the quartz glass crucible cools off its final shape is already present and the inner side of the wall is vitrified, while the outer wall is still coated with $SiO_2$ granulate which is then removed by rubbing or polishing. The outer side is not vitrified.

Such a process is the subject of DE 197 10 672 A1 which additionally concerns producing a layered structure having special properties by means of pouring in $SiO_2$ granulates containing additional components.

A fundamentally important aspect of the process is maintaining of rotational speed of the melt form which is determined in particular by the geometric dimensions of the quartz glass crucible, because the $SiO_2$ granulate is kept in the shape formed by the template by centrifugal forces. An inadequate rotational speed and the corresponding low centrifugal force will have the result that loose $SiO_2$ granulate cannot be held in the desired position and will partially slip to the bottom of the melt form. Conversely, a high speed of rotation leads to an outward displacement of the bottom layer of the quartz glass crucible and its rupture. The speed of rotation is therefore variable only to a very limited degree.

Therein lies the disadvantage that a sufficiently high and even heating of the wall, especially in large crucibles, can only be achieved by operating the electrode arrangement at high heat output rate. However, this can result in vaporization phenomena and bubble formation during the pouring of the $SiO_2$ granulate, significantly reducing the quality of the final product. Moreover, the buildup rate of the inner layer is reduced (due to higher vaporization). In addition, partial heating of a section of the rotating wall causes a cooling phase which corresponds to the duration of a complete revolution until the section of the wall returns to the heating zone, and its duration results in great temperature variations and therefore in reduction of quality, especially in cases of slow rotation and large-diameter crucibles.

Before this background the object of the invention is to develop a process of the kind described at the onset in such a way that temperature differences can be substantially reduced independently from the rotational speed of the quartz glass crucible in order to largely eliminate especially the undesirable vaporization and bubble formation due to strong heating or cooling. Moreover, a device for the implementation of the process is to be created.

The first object is achieved in accordance with the invention in that at least one additional electric arc is formed by at least one additional electrode arrangement comprising one or several anodes and a cathode so that an additional section of the wall of the quartz glass crucible is being heated. Each individual electrode arrangement can be thereby operated at reduced heat output. Vaporization, especially during the pouring in of $SiO_2$ granulate, can be largely eliminated. Additionally, at a geometrically predetermined speed of rotation, it is possible to substantially shorten the duration of the cooling phase until a given section of the wall is again in the next heating zone of the next following electrode arrangement. The actual temperature differentials are thus considerably reduced. At the same time, the thickness of the inner layer created by the pouring in of $SiO_2$ granulate can be increased, while in addition, that portion of the $SiO_2$ granulate which vaporizes at the higher heating rates of the prior art is now available to a greater degree for the creation of the inner wall. The added expense of evacuating the vaporized components of the $SiO_2$ granulate is also eliminated so that a nearly complete automation of the manufacturing process becomes possible. Furthermore, the duration of the manufacturing process is also reduced, leading to a better utilization rate of the equipment and a greater efficiency.

A particularly advantageous development of the process is achieved in that the electrode arrangement heats different sections located at a distance from one another in the direction of the rotation of the quartz glass crucible. A large-surface heat transfer is achievable by means of electrode arrangements provided therefor at different vertical positions, thus shortening the manufacturing process. At the same time, more even heating of the quartz glass crucible is achieved, together with a correspondingly improved quality.

The second object, to provide a device for producing a rotationally symmetrical quartz glass crucible through zone-wise heating by means of an electrode arrangements provided for the creation of an electric arc and comprising one or several anodes and a cathode while the crucible is rotatable about its rotational axis, is achieved in accordance with the invention in that in addition to the first electrode arrangement the device is provided with at least one additional electrode arrangement comprising one or several anodes and a cathode, inclined toward the section of the quartz glass crucible which lies opposite the first electrode arrangement. In this way the temperature of the quartz glass crucible can be kept at a relatively high level independent from the speed of rotation, so that any temperature differences are substantially smaller. A surface section, especially a wall or floor section heated by the first electrode arrangement, reaches the heating zone of the second electrode arrangement after only small angular travel while the individual electrode arrangement may be operated at a reduced heat output rate. The reduced vaporization resulting therefrom permits on the one hand the elimination of additional measures for the evacuation of the vaporized components, and on the other hand increases the usable portion of the poured SiO2 granulate so that a faster buildup of the inner layer and a considerably higher density is achieved. Furthermore, a substantially bubble-free inner layer is created making higher quality requirements easily achievable. At the same time, the number of rejects among quartz glass crucibles produced in this fashion and the duration of the manufacturing process are reduced, which results in an improved efficiency of the manufacturing process. In addition, significantly larger crucible diameters can be produced than was possible heretofore by means of the prior art.

A particularly advantageous embodiment of the invention is provided in that the electrode arrangements are disposed in different positions at a distance from one another in the direction of the rotational axis of the quartz glass crucible.

In this way, a large-surface heating of for example a portion or of the entire wall surface of the quartz glass crucible is possible in order to achieve an even heating. In addition to an increase in quality this also leads to a reduced duration of the manufacturing process and with it, to a lesser manufacturing expense.

It is also especially useful if the electrode arrangements are movable independently. This enables an optimal adaptation to the various crucible shapes by means of a correspondingly adjusted distance from the wall. The quality attainable by the device can be therefore improved further, and, without altering the construction of the device, it is possible to manufacture especially costly shapes that deviate from the simple pot or cylinder shapes of quartz glass crucibles and have for example larger diameters as well.

In a further development of the invention particularly well suited therefor, the electrode arrangements are evenly distributed in relation to the periphery of the quartz glass crucible. The cooling phase of a wall section between two sequential heating zones of the different electrode arrangements is determined by the geometric dimensions, including the resulting rotational speed of the quartz glass crucible, and is thereby kept constant so that undesired temperature fluctuations can be avoided. The device equipped in this way therefore leads to further quality improvement.

Another advantageous variation of the invention is given by providing at least one electrode arrangement with a $SiO_2$ supply means while at least one additional electrode arrangement is provided exclusively for heating. A simplification of the device and its control is achieved thereby, with one electrode arrangement being used exclusively for the heating of a wall section while $SiO_2$ granulate is poured into the electric arc of a further electrode arrangement, building up an inner layer of the quartz glass crucible.

The invention permits various embodiments. In order to further clarify the invention's basic principle, one of the embodiments is represented in the drawing and is described below. The drawing shows in a side view a melt form 1 with a quartz glass crucible 2 inserted therein and designed as a crucible. Positioned above an opening 3 of the quartz glass crucible 2 is a device 5 provided with cooling body 4 in the form of a cooling plate. A first electrode arrangement 7 and a further electrode arrangement 8 extend through the device 5 into an inner space 6 of the quartz glass crucible 2. The said electrode arrangements 7, 8 are each provided with one or several anodes 9 and a cathode 10 and after the ignition of an electric arc each creates a heating zone 11, 12 in the area of a wall 13 of the quartz glass crucible 2. A section 14, 15 of the wall 13 is heated in the said heating zones 11, 12, with the heating duration of the respective sections 14, 15 determined by the speed of rotation of the quartz glass crucible 2, which is rotating about a rotational axis 16. The rotational speed is in turn defined especially by the geometry of the quartz glass crucible 2 because the $SiO_2$ granulate, at first lying loosely against the melt form 1 and forming the subsequent quartz glass crucible 2, is kept in a shape created by a template only by centrifugal force during the rotation. An excessively high rotational speed of the quartz glass crucible leads to an undesirable outward displacement of the $SiO_2$ granulate especially in the floor region of the quartz glass crucible 2, while on the other hand a too low speed of rotation results in a slipping of the granulate toward the bottom. The use of two electrode arrangements 7, 8 therefore shortens the cooling phase of section 14, 15 between the respective successive heating zones 11, 12 thereby reducing the temperature differentials of the wall 13. At the same time the heat output of each individual electrode components is minimized and the resulting end product is substantially bubble-free.

| List of references |
|---|
| 1 Melt form |
| 2 Quartz glass crucible |
| 3 Opening |
| 4 Cooling body |
| 5 Device |
| 6 Inner space |
| 7 Electrode arrangement |
| 8 Electrode arrangement |
| 9 Anode |
| 10 Cathode |
| 11 Heating zone |
| 12 Heating zone |
| 13 Wall |
| 14 Section |
| 15 Section |
| 16 Rotational axis |
| 17 Floor |

The invention claimed is:

1. A process for producing a rotationally symmetrical quartz glass crucible, said process comprising:
    creating an electric arc by means of an electrode arrangement comprising one or several anodes and a cathode so as to heat a wall section of the quartz glass crucible as said quartz glass crucible is rotated about a rotational axis at a rate or rotation;
    creating an additional electric arc heating an additional wall section of the quartz glass crucible by means of at least one additional electrode arrangement comprising one or more anodes and a cathode; and
    wherein the electrode arrangements and respective heating zones thereof are spaced from each other in relation to a periphery of the quartz glass crucible; and
    said electric arcs being created so as to reduce temperature differentials in the wall sections as the crucible is rotated relative to temperature differentials in a process employing a single electrode arrangement.

2. A process according to claim 1, wherein the wall sections heated by the electrode arrangements are located at a distance from one another in a direction of the rotational axis of the quartz glass crucible.

3. A process according to claim 1, wherein the electrode arrangements are located in different positions at a distance from one another in a direction of the rotational axis of the quartz glass crucible.

4. A process according to claim 1, wherein the electrode arrangements are displaceable independently from one another.

5. A process according to claim 3, wherein the electrode arrangements are displaceable independently from one another.

6. A process according to claim 1, wherein the electrode arrangements are evenly spaced in relation to the periphery of the quartz glass crucible.

7. A process according to claim 3, wherein the electrode arrangements are evenly spaced in relation to the periphery of the quartz glass crucible.

8. A process according to claim 4, wherein the electrode arrangements are evenly spaced in relation to the periphery of the quartz glass crucible.

9. A process according to claim 5, wherein the electrode arrangements are evenly spaced in relation to the periphery of the quartz glass crucible.

10. A process according to claim 1 wherein at least one of the electrode arrangements is provided with a supply apparatus and supplies $SiO_2$ granulate, and at least one of the electrode arrangements provides exclusively heating.

11. A process according to claim 3 wherein at least one of the electrode arrangements is provided with a supply apparatus and supplies $SiO_2$ granulated, and at least one of the electrode arrangements provides exclusively heating.

12. A process according to claim 4 wherein at least one of the electrode arrangements is provided with a supply apparatus and supplies $SiO_2$ granulate, and at least one of the electrode arrangements provides exclusively heating.

13. A process according to claim 1 wherein the additional electrode arrangement is inclined toward a section of the quartz glass crucible opposite the first electrode arrangement.

14. The process according to claim 1, wherein the heating of each electrode arrangement is applied for a duration and the duration is dependent upon the rate of rotation or the quartz glass crucible.

15. A process for producing a rotationally symmetrical quartz glass crucible, said process comprising:
creating electric arcs by means of plurality of electrode arrangements each comprising a cathode and one or more anodes, and each heating in a respective healing zone a wall of the quartz glass crucible while said quartz glass crucible is rotated about a rotational axis thereof; and
the heating zones of the electrode arrangements being spaced from each other in relation to a periphery of the quartz glass crucible; and
the heating zones of the electrode arrangements being evenly distributed about the periphery of the quartz glass crucible.

16. A process according to claim 15, wherein the electrode arrangements are located in different positions at a distance from one another in a direction of the rotational axis of the quartz glass crucible.

17. A process according to claim 15, wherein the electrode arrangements are displaceable independently of each other.

18. A process according to claim 15 wherein at least one of the plurality of electrode arrangements has a supply apparatus and supplies $SiO_2$ granulate in addition to heating the wall of the quartz glass crucible, and at least one of the plurality of electrode arrangements does not supply granulate but provides only heating of the wall of the crucible.

19. The process according to claim 15, wherein the heating of each electrode arrangement is applied for a duration and the duration is dependent upon a rate of rotation of the quartz glass crucible.

20. A process for producing a quartz glass crucible, said process comprising:
rotating the crucible about a rotational axis at a rate of rotation;
supplying $SiO_2$ particulate material into the crucible while it is being rotated;
creating electric arcs using a plurality of electrode arrangements, wherein each electrode arrangement has a cathode and one or more anodes, each electrode arrangement heating a wall of the quartz glass crucible in a respective heating zone while said quartz glass crucible is rotated so as to heat the $SiO_2$ particulate material pressed against the wall by centrifugal force from the rotation so as to form a glass surface on said wall, the electrode arrangements being located evenly distributed rotatively about the periphery of the quartz glass crucible;
the electric arcs being created such that points on the wall are heated at least twice per revolution so as to reduce temperature differences therein.

21. The method of claim 20 wherein the hearing of each electrode arrangement is applied for a duration and the duration is dependent upon a rate of rotation of the quartz glass crucible.

* * * * *